United States Patent

Moura et al.

[11] Patent Number: 5,854,856
[45] Date of Patent: *Dec. 29, 1998

[54] CONTENT BASED VIDEO COMPRESSION SYSTEM

[75] Inventors: Jose M. F. Moura; Radu S. Jasinschi, both of Pittsburgh, Pa.

[73] Assignee: Carnegie Mellon University, Pittsburgh, Pa.

[*] Notice: This patent issued on a continued prosecution application filed under 37 CFR 1.53(d), and is subject to the twenty year patent term provisions of 35 U.S.C. 154(a)(2).

[21] Appl. No.: 504,379

[22] Filed: Jul. 19, 1995

[51] Int. Cl.$^6$ .................................................... G06K 9/36
[52] U.S. Cl. ........................ 382/232; 382/232; 348/415; 348/416
[58] Field of Search .................................. 382/236, 232; 348/415, 416

[56] References Cited

U.S. PATENT DOCUMENTS

| | | | |
|---|---|---|---|
| 5,103,305 | 4/1992 | Watanabe | 382/236 |
| 5,262,856 | 11/1993 | Lippman et al. | 358/136 |
| 5,267,334 | 11/1993 | Normille et al. | 382/236 |
| 5,325,449 | 6/1994 | Burt et al. | 382/56 |

*Primary Examiner*—Jose L. Couso
*Assistant Examiner*—Anh Hong Do
*Attorney, Agent, or Firm*—Kirkpatrick & Lockhart LLP

[57] ABSTRACT

A content based method of compressing a segment of video is implemented in two stages. In a spatial integration stage, figures are represented in terms of compact models. In a temporal integration stage, which uses the information from the spatial integration stage, constructs, i.e., world images and data describing relationships between world images and frames, are generated. In operation, each frame in a series of frames is preprocessed to tessellate any moving figures and to obtain motion data for the moving figures and for the image background. The figure motion data is stored in a manner so as to associate the motion data with the original frame. Frame information identifying the size and position of each frame with respect to a background world image is also stored. Each tessellated figure is compared to the original frame to produce a template for each moving figure and a template for the background. Each template is compared to a world image that is associated with that template so that material common to both can be cut and the remaining material added to form a new world image. The steps are repeated until all frames in the segment are processed. The resulting world image data, figure motion data, and frame information are output for transmission or storage. The world image data may be compressed prior to transmission or storage.

13 Claims, 20 Drawing Sheets

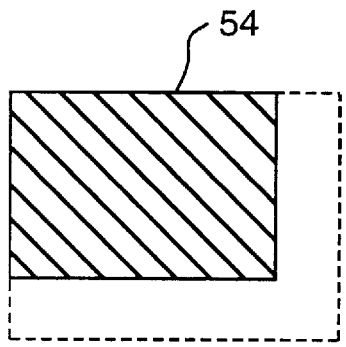
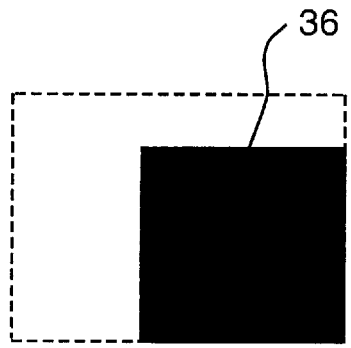
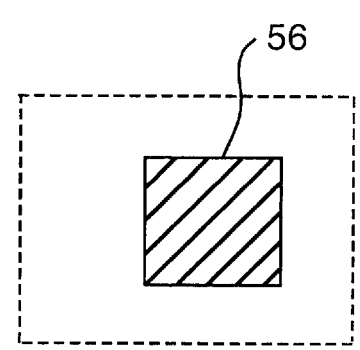
FIG. 8      FIG. 9      FIG. 10
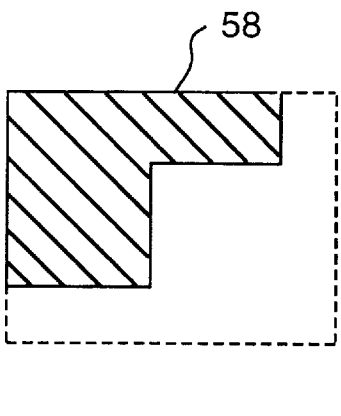
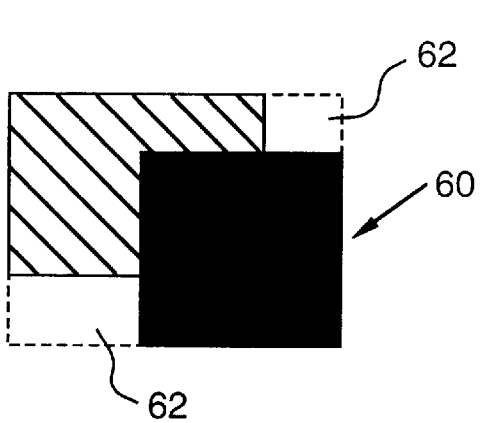
FIG. 11      FIG. 12

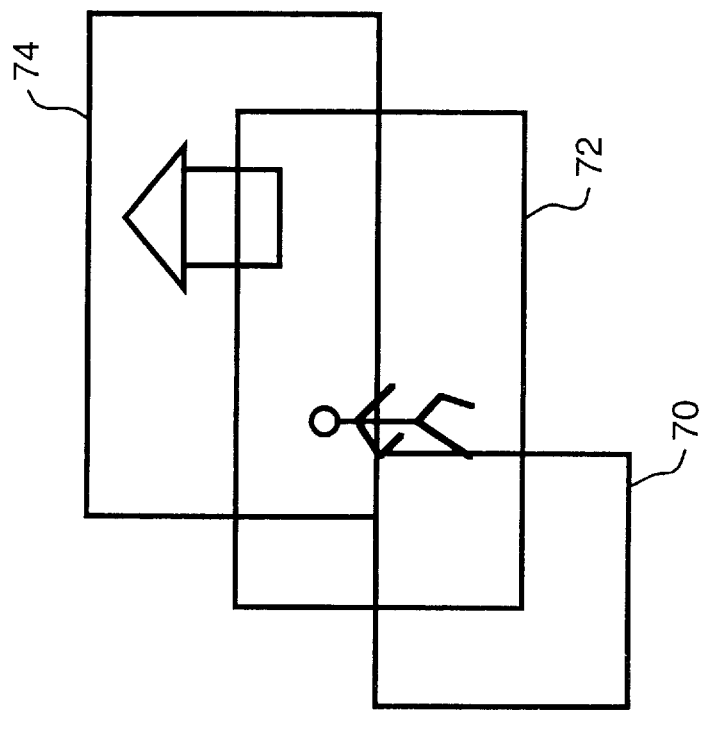
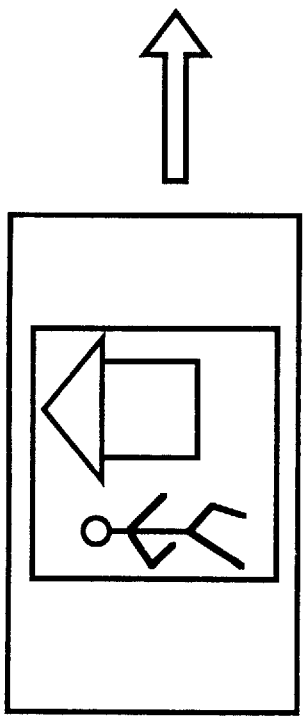
FIG. 29b
FIG. 29a

CONTENT BASED VIDEO COMPRESSION SYSTEM

BACKGROUND OF THE INVENTION

1. Field of the Invention

The present invention is directed generally to the processing of video data and more particularly to video sequence coding and compression.

2. Description of the Background

The processing of video sequences requires the manipulation of large volumes of data which strain the limits of storage space, transmission times, bandwidth, and computational resources. Thus, the compact representation of video sequences is important for any application involving the manipulation and transmission of video sequences such as teleconferencing, video telephoning, medical imaging, satellite imagery, and robot navigation. The ability to transmit video sequences over the internet or through other transmission channels for applications such as, for example, on demand programming, is dependent upon some type of compression technique to make transmission times manageable.

In current techniques, e.g., the video standard MPEG, video sequence compression is realized by exploiting the spatial redundancy in individual images, e.g., through DCT, and the temporal redundancy across images, e.g., through block-based predictive motion compensation. Those approaches do not fully explore the potential of spatial and temporal redundancy reduction because successive images in the sequence contain, in general, large areas of overlap which are repeatedly processed and stored. The current techniques provide compression ratios in the range of 40–100. However, to deal with applications, such as video telephoning and teleconferencing, very low bitrate compression is required. Very low bit-rate compression is described by bit-rates between 8K bits per second (bps) and 64 Kbps. To obtain NTSC quality, i.e., thirty (512×512) pixel images per second with 8 bits per pixel (bpp) and three colors corresponding to roughly 180 Mbps, requires compression ratios in the range of $10^3$ to $10^4$. That is, video sequences must be compressed from a bit-rate of 180 Mbps to, say, 64 Kbps, which is a factor of approximately 3000.

Because current approaches to video compression focus computational resources on processing individual pixels and images, those techniques cannot currently increase the compression ratio by the orders of magnitude that are required. Thus, the need exists for a method of compressing video segments which delivers a more extensive redundancy reduction to achieve compression ratios of between 1,000 and 10,000. Also, the need exists for a method of reconstructing such compressed video into a video output.

SUMMARY OF THE INVENTION

The present invention is directed to a content based method and apparatus of compressing a video segment comprised of a series of frames. The method includes preprocessing a frame to tessellate any moving figures and to obtain motion data for the moving figures. The figure motion data is stored in a manner so as to associate the motion data with that frame. Frame information representative of the size and position of the original frame with respect to a background world image is also stored. A world image is an image of the background or of a figure which contains all of the information that can be learned about the background or figure from the video segment. Each tessellated figure is compared to the original frame to produce a template for each moving figure and a template for the background. Each template is compared to an instance of a world image that is associated with that template so that material common to both can be cut from one, and the remaining material added to form a new world image. That is accomplished through cut and paste processors or operators. The steps are repeated until all frames in the series are processed. The figure world images and the background world image are organized in a stack according to how corresponding figures in the world are distributed at different depth levels. The resulting data, i.e., world image data, figure motion data, frame information, and stacking information, are output for transmission or storage.

The present invention is also directed to a method of and apparatus for reconstructing a frame from world images, figure motion data, and frame and stacking information. The method includes the steps of positioning each figure world image on the background world image using the figure motion data and stacking information for the frame of interest. The boundaries of the frame of interest are identified, and the portion of the figure and background world images that falls within the boundaries is output.

Frame information identifies which portion of the world image is seen in a particular frame as selected by an image window operator. The figure motion data identifies which, if any, moving figures should be represented in a frame and how any such moving figures should be positioned within the frame. Stacking information provides depth information for placing figure world images on the background world image. In that manner, by having a world image for the background as well as a world image for all of the moving figures, the figure motion data, frame information, and stacking information allows any particular frame or series of frames to be reconstructed. Because the method and apparatus of the present invention fully exploit the redundancy from one frame to the next, compression ratios on the order of $10^3$ to $10^4$ are achievable, based on the number of frames being processed. Additionally, the processing occurs at a higher level based on content, i.e., image region, rather than at a low level, i.e., based on analysis of each pixel, as is usually done in the prior art. Using a high level content based approach requires less computational resources than an approach based on a pixel by pixel analysis. Those and other advantages and benefits of the present invention will become apparent from the Detailed Description Of The Preferred Embodiments hereinbelow.

BRIEF DESCRIPTION OF THE DRAWINGS

For the present invention to be clearly understood and readily practiced, the present invention will be described in conjunction with the following figures wherein:

FIGS. 8 through 12 are a series of illustrations which graphically show what the cut and paste operators do;

FIGS. 29a and 29b illustrate the stratification or stacking principle;

DETAILED DESCRIPTION OF THE PREFERRED EMBODIMENTS OVERVIEW

Figure 1:
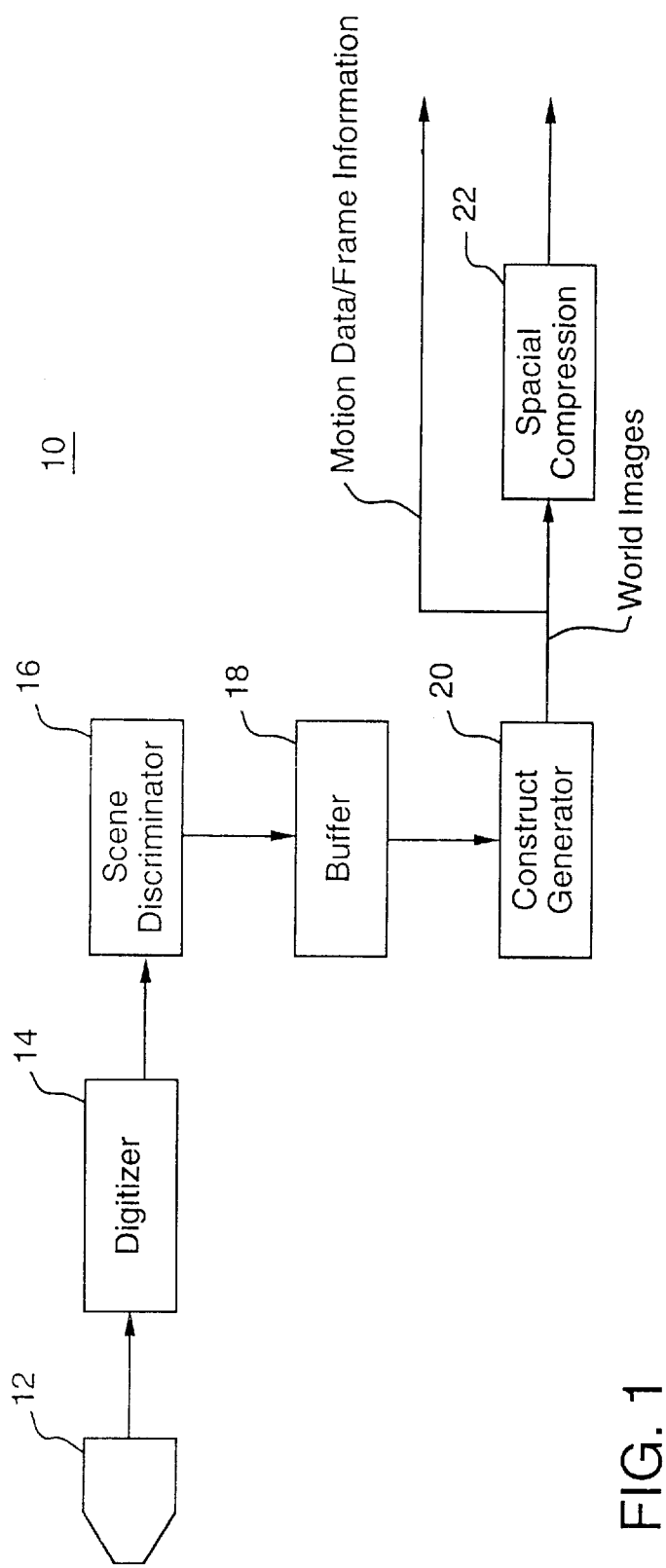
FIG. 1 is a high level block diagram illustrating a system for compressing video segments constructed according to the teachings of the present invention.

FIG. 1 is a high level block diagram illustrating an apparatus 10 for compressing a video segment comprised of a series of frames (not shown in FIG. 1) according to the teachings of the present invention. As used herein, the phrase video segment means at least two video frames. A video camera 12 provides raw video data which is input to a digitizer 14. The camera 12 may be of any type, e.g., a motion picture camera, a television camera, or a camcorder. Digitizer 14 digitizes the raw video data using techniques well known in the art. The raw video data need not be generated by a camera, but could also be generated by a graphic tool or it could be an animation.

A scene discriminator 16 is responsive to the digitized data and, using techniques that are well understood in the art, creates multiple video segments with each video segment being directed to one scene. For example, when the contents of successive frames cannot be correlated, scene discriminator 16 creates a series of frames that starts at the point where the contents of the successive frames could not be correlated. Scene discriminator 16 thus detects changes in scenery when the camera moves from one location to another or when a subsequent frame is vastly different from a preceding frame such that a change in scene is indicated. Each video segment may be stored in a buffer 18. Buffer 18 may be of any type known in the art.

Each series of frames is processed by a construct generator 20. The construct generator 20 generates world images, figure motion data stored per frame, frame information, and, if applicable, stacking information. World images are augmented images representing the non-redundant information in a video segment. A world image describes all that can be seen of a particular object, or background, in a video segment. For example, if camera 12 is panned with respect to a static three-dimensional scene, the corresponding world image describes the panoramic view of the scene. The world image is recursively generated through cut-and-paste operators described below. A figure world image is associated with each independently moving figure, or figure region. A background world image is associated with a static or slowly varying background. The final world images output from construct generator 20 contain no redundant information.

Frame information provides information which identifies the size and position of each frame with respect to the background world image. Figure motion data provides information about the size and position of figure world images with respect to the frames in which the figures can be seen. Stacking information identifies which objects, if any, appear on top of (i.e., in front of) other objects in the scene.

The construct generator processes video sequences in terms of its content. The invention classifies video sequence content in terms of the velocity and shape of image regions, although other attributes such as color and texture could be used. Image regions are divided into figure and background regions. The figure regions comprise the objects which move independently across the image. The background regions are those parts of the image that are static or slowly moving in time. Superimposed on figure motion is camera motion, which determines how a camera captures different snapshots of a world scene. The motion of the image background is due to camera motion. The motion of figures is composed of the motion of the figure relative to the image background plus camera motion. The invention discriminates between image figures and image background, and they correspond to the video sequence content which is processed.

In a preferred embodiment of the present invention, the world images are spatially compressed by a compression circuit 22 or algorithm before the images are output for storage or transmission. Spatial compression may be accomplished by any method known in the art, e.g, using a noncausal Gauss-Markov random field approach as taught in J. Moura and N. Balram, "Recursive Structure of Noncausal Gauss-Markov Random Fields," *IEEE TRANS Inform. Theory,* Vol. I. T.-38(2), pp. 334–354, 1992. That approach delivers compression ratios in the range of 20–50, which is larger by a factor of three than those that JPEG produces.

In the present invention, each frame in a video sequence is considered to be a partial snapshot of the world. The world might be a real three-dimensional outdoor scene, or a synthetic scene generated using graphic tools. The world is assumed to be represented by the world images, one for the background and the others for figures moving independently of the background. The world images are stratified in a stack which is generated in accordance with how the different figures and the background are distributed at different depth levels in space. The challenge is to generate world images from the partial viewings provided by each frame. That is accomplished through a recursion by removing from each image the regions that it has in common with other images in the video segment and adding the remaining regions to the corresponding instance of the world image.

DETAILED DESCRIPTION

Figure 2:
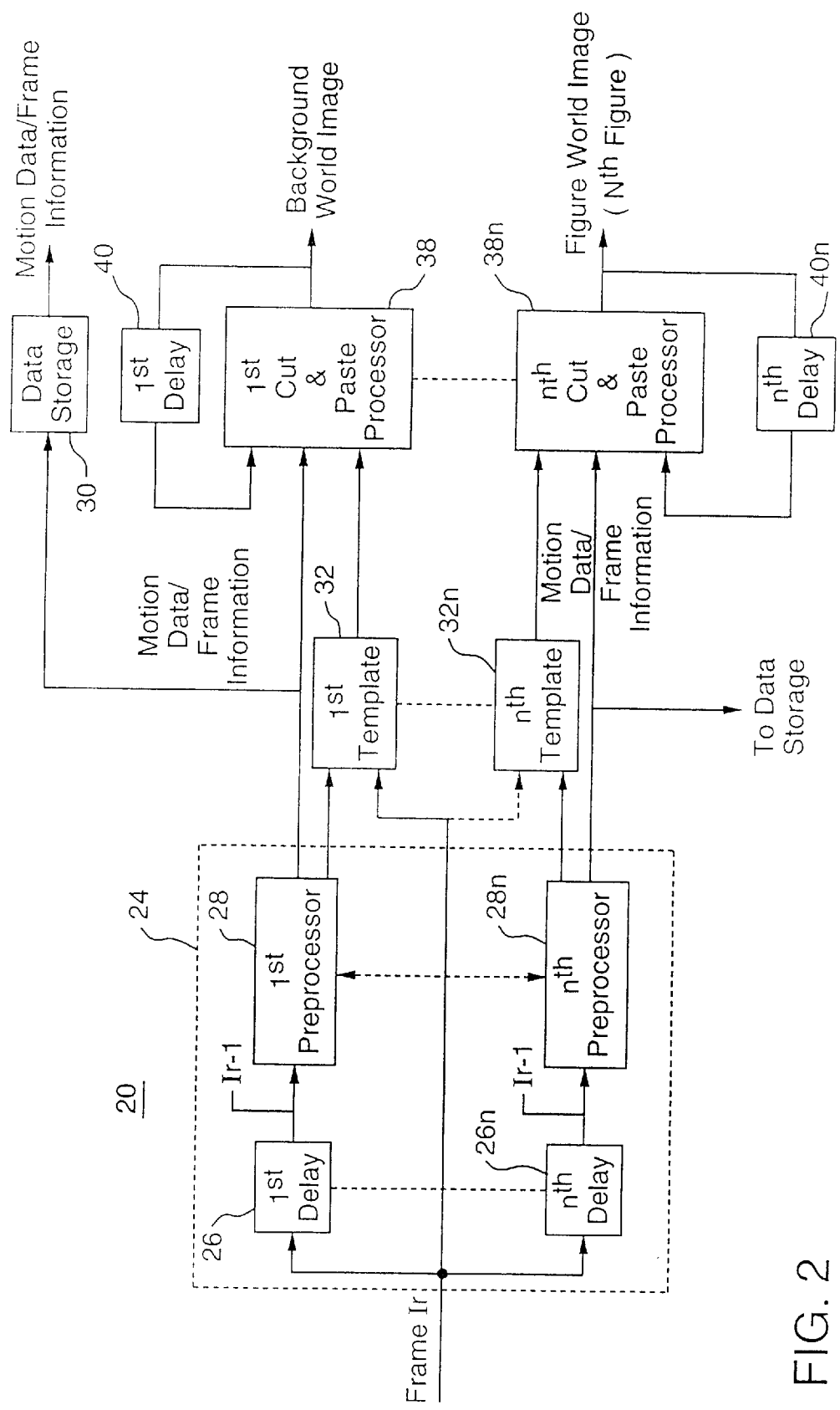
FIG. 2 is a block diagram illustrating the construct generator illustrated in FIG. 1.

A block diagram illustrating the construction of the construct generator 20 is shown in FIG. 2. As shown in FIG. 2, each frame $I_r$ (where r=0, ..., n) of a video segment is input to a preprocessor stage 24. Preprocessor stage 24 is comprised of parallel paths, each comprised of a delay circuit 26 and a preprocessor 28. There are as many parallel paths as there are world images. The purpose of each of the parallel paths is to perform motion estimation, segmentation, and shape tessellation. First, moving figure velocity and background velocity are estimated. Second, the figure velocity is compensated with relation to the background velocity. Third, the figure is segmented using a threshold to detect if a figure moves in relation to the background. Fourth, the segmented figures are tessellated into a rectangular-shaped simple model. That process results in what is called a figure template. That series of steps represents a first stage of the construct generator 20 which may be referred to as the spatial integration stage. The spatial integration stage results in a representation of all figures in terms of compact models.

Tessellation is capable of handling arbitrary and complex shaped moving figures. In a preferred embodiment, the moving figure is tessellated using a rectangular approximation technique. The particular method employed by the preprocessor stage 24 to derive the motion data and perform the tessellation are not of particular significance to the method and apparatus of the present invention. The theory supporting one particular method of operating the preprocessor stage 24 is set forth in the Experimental Results section appearing hereinbelow. However, the present invention is not limited to any particular mode of operation of preprocessor stage 24 and it is anticipate that those of ordinary skill in the art will be capable of devising other schemes for controlling the operation of preprocessor stage 24.

The figure motion data that is generated by preprocessor stage 24 is stored in a data storage device 30 in a manner that associates the motion data with the original frame from which it was derived. In a preferred embodiment, data representative of the center (or any other reference pixel) of the tessellated figure and data representative of the size and position of each moving figure within each frame is stored. That data may include a pointer which identifies the coordinates of the reference pixel or centers of each moving figure within each frame. Information (pointers) about the size and position of the frame is also stored.

Each tessellated figure output by each processor 28, 28n is compared by a circuit 32, 32n, respectively, to the original frame to produce an instance of a template for each moving figure and an instance of a background template.

Figure 3:
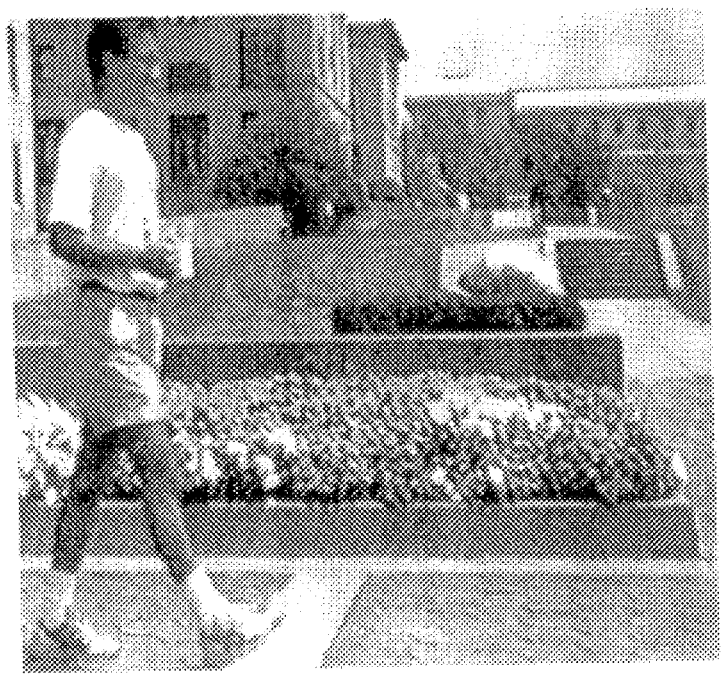
FIG. 3 through 6 are a series of photographs which illustrate how the preprocessing function operates.
Figure 4:
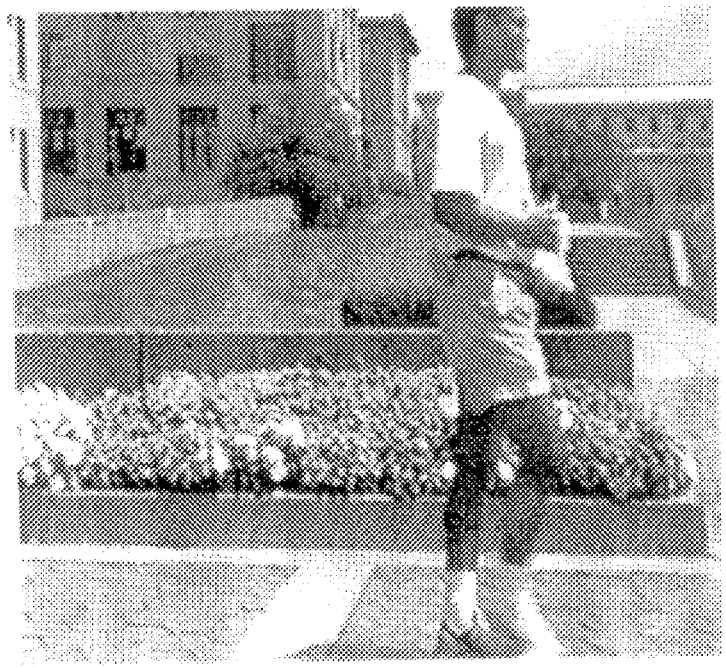
Figure 5:
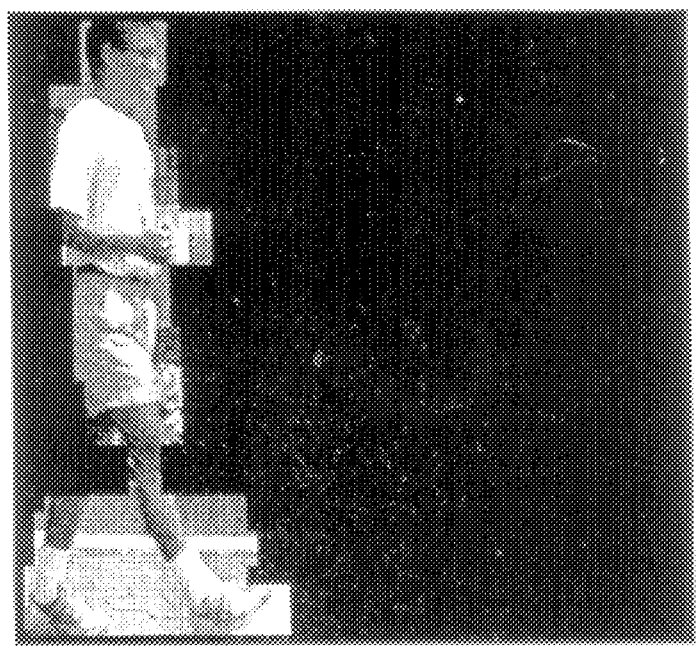
Figure 6:
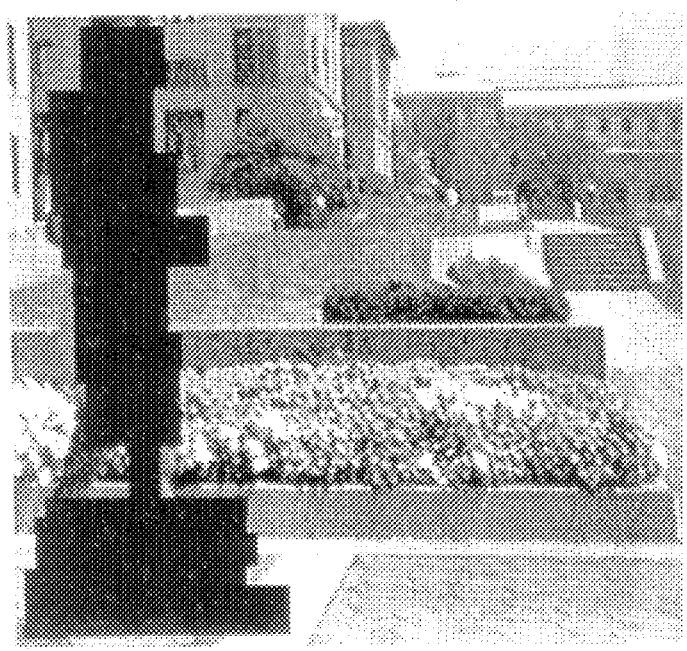

FIGS. 3–6 graphically illustrate the operation of preprocessor stage 24. FIGS. 3 and 4 represent successive frames in a series of frames of an individual walking across a background scene with FIG. 3 representing frame $I_{r-1}$ and FIG. 4 representing frame $I_r$. By comparing frame $I_r$ with frame $I_{r-1}$, preprocessor stage 24 detects motion in the frame $I_{r-1}$ and estimates the image velocity of the figure and the velocity of the background. Preprocessor stage 24 then tessellates the moving figure to produce a moving figure template 34 as represented by FIG. 5 and a background template 36 as represented by FIG. 6. As is seen, the templates 34 and 36 are the complement of one another, i.e., subject matter in one is omitted from the other, and vice versa. That represents the spatial integration stage of the invention.

Background template 36 is input to a cut-and-paste processor 38 and the figure template 34 is input to a cut-and paste processor 38n. Cut-and-paste processors 38, 38n compare each of the instances of templates with a world image that is input through a feedback loop including a delay circuit 40. The world image associated with that template is feedback for the purpose of cutting material that is common to both the world image and the template from either the world image or the template. The remaining material is added to form a new world image. The resulting world images are augmented images representing the nonredundant information in the video segment.

Figure 7:
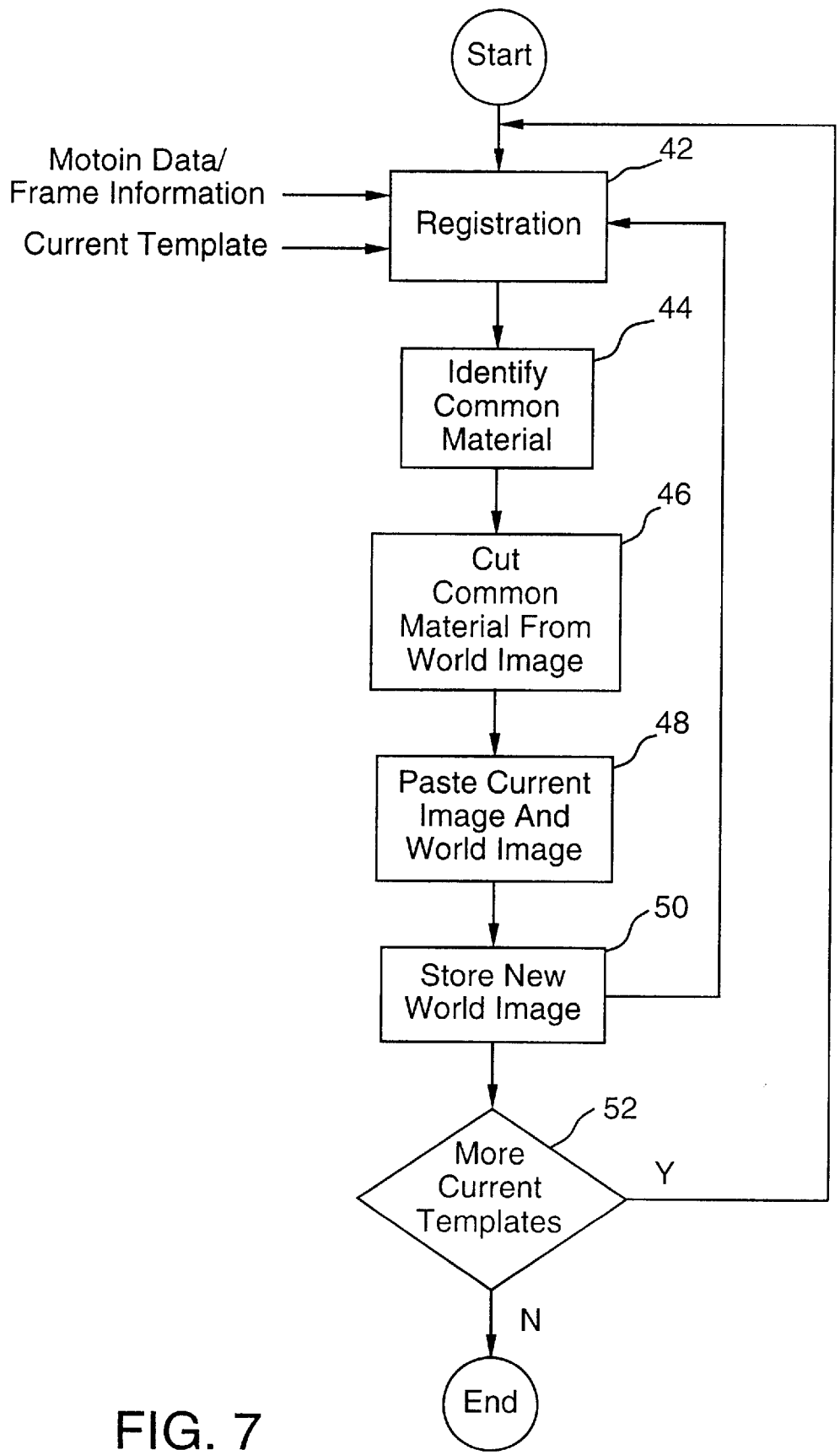
FIG. 7 is a flow chart illustrating the steps carried out by the cut and paste processors.

FIG. 7 is a flow chart illustrating the basic operation of cut-and-paste processor 38. All of the other cut-and-paste processors operate in a similar manner. In step 42, motion data is used to register the current image background template with the background world image. Cut-and-paste processor 38 then identifies at step 44 any material that is common to the background template 36 and the background world image. The common material is cut at step 46, preferably from the background world image. Alternatively, the common material may be cut from the background template 36. After cutting the common material, the remaining material in the background world image is added, or pasted, together with the background template at step 48 to form a new world image. The new world image is stored at step 50 for use in later comparisons with subsequent current background templates 36.

The pasting of the new material with the old material may include a stage of equalizing the illumination levels of both, e.g., by histogram equalization techniques, or other filtering operations to smooth out intensity differences between both.

Cut-and-paste processor 38 determines at decision step 52 if there are more current background templates 36 to process. If there are more current background templates 36 that have not been processed, process control returns to step 42, and steps 42 through 52 are repeated. If there are no more current background templates 36 to process, the cut-and-paste processor 38 outputs a final background world image as shown in FIG. 2.

FIGS. 8 through 12 graphically illustrate how the cut-and-paste processor 38 operates. FIG. 8 shows a background world image 54 while FIG. 9 shows a current background image template 36. FIG. 10 shows the material 56 that is common to both the background world image 54 and the current background image template 36. The common material 56 is cut and the resulting background world image 58 is shown in FIG. 11. FIG. 12 depicts the new background world image 60 that is formed after the nonredundant material, i.e., the current background template 36, is pasted onto the remainder of the world image 58. Note that in FIG. 12 there are areas 62 of the new background world image 60 that are unknown, probably because they have been occluded by moving figures. Should the moving figures stop occluding areas 62, those areas will be filled in. However, it is possible to have a final background world image 60 that has unknown areas 62. That is not a problem because upon reconstruction, the moving figure that occluded areas 62 will similarly occlude areas 62 in the reconstructed frame.

A similar cut and paste operation is used for generating the figure world images as discussed below with respect to FIGS. 13–20. The operation of the templates 32, 32n in conjunction with the cut and paste processors 38, 38n may be thought of as the second stage of the present invention.

Figure 13:
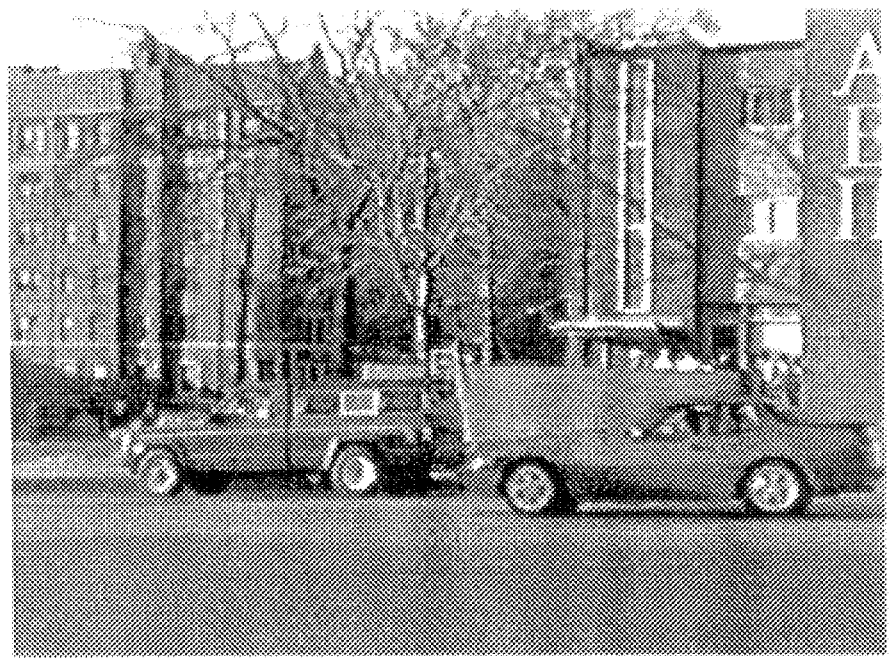
FIGS. 13 through 20 illustrate the operation of the cut and paste processors in dealing with figure motion.
Figure 14:
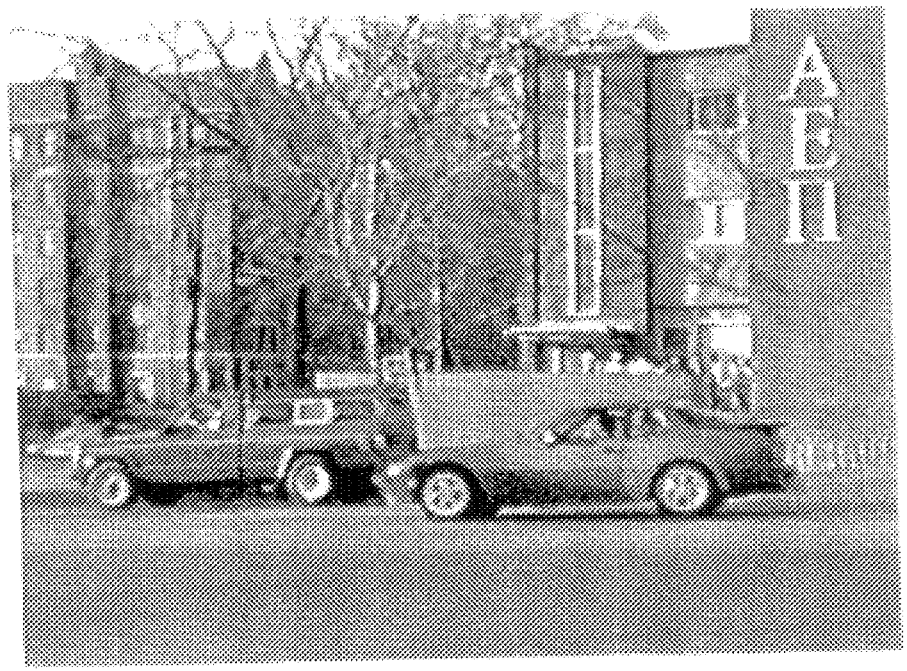

The example of FIGS. 8 through 12 is simplified in that it represents a moving background without any moving figures. The sequence of FIGS. 13 through 24 illustrates the process of the present invention with respect to a camera 12 which is panning to the right as seen by a comparison of FIGS. 13 and 14 while an automobile moves independently of the background to the left as seen in FIGS. 13 and 14. The cut and paste processors first deal with figure motion and then deal with the changing background as discussed hereinabove in conjunction with FIGS. 8 through 12.

Figure 15:
Figure 16:
Figure 17:
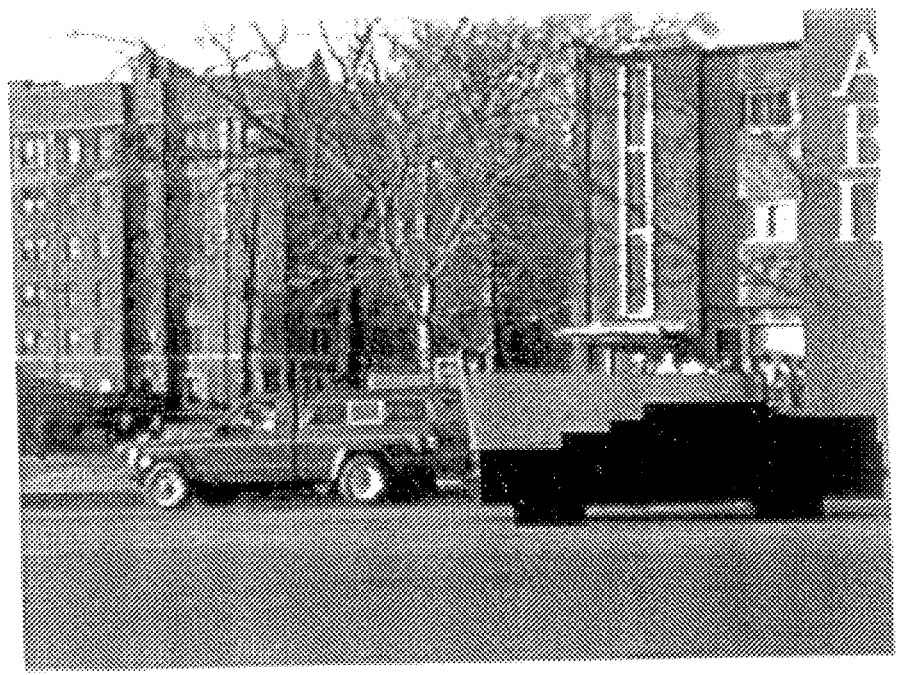
Figure 18:
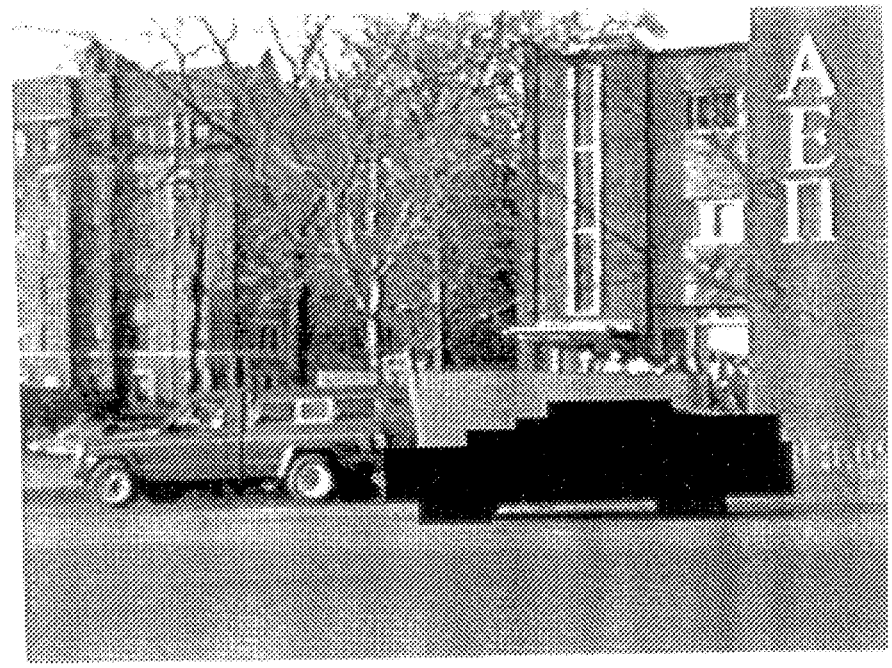

FIG. 15 and FIG. 16 represent instances of a figure template corresponding to the moving vehicle in FIGS. 13 and 14, respectively. The areas in white, corresponding to 255 in the image grey-level scale, correspond to the figure template. The component areas in black, which correspond to zero in the grey-level scale, correspond to the background image template. In FIGS. 17 and 18, the result of applying the background templates to the original images is shown. The regions in black correspond to the automobile being cut from the original images.

Figure 19:
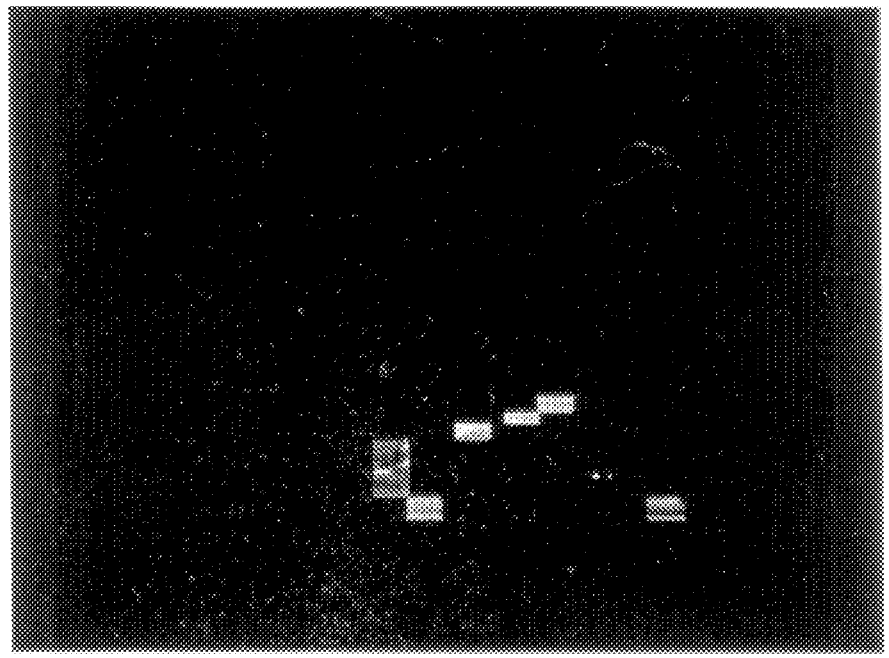
Figure 20:
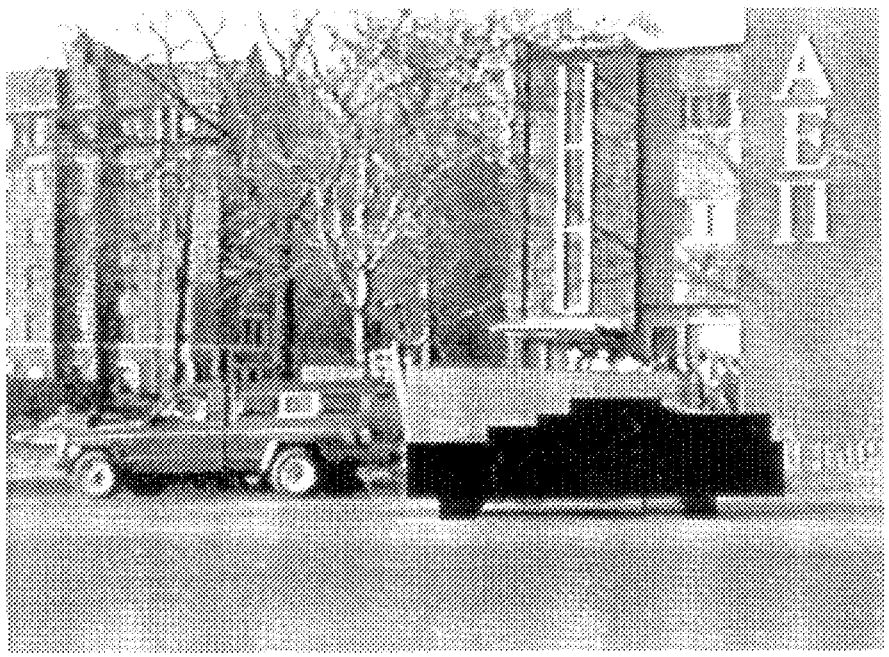
Figure 21:
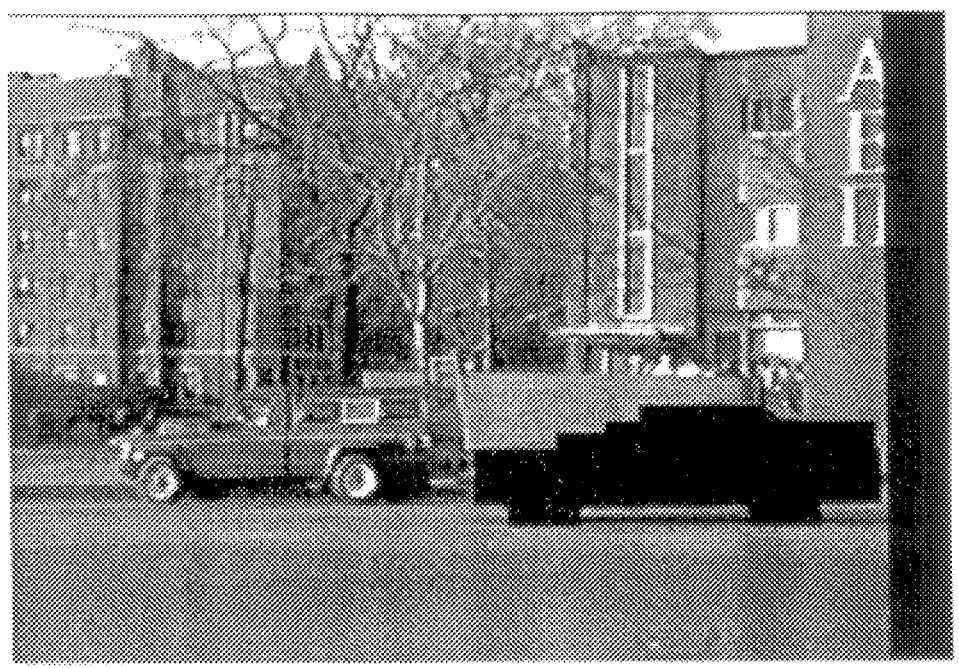
FIGS. 21 through 24 illustrate the operation of the cut and paste processors in dealing with camera motion.
Figure 22:
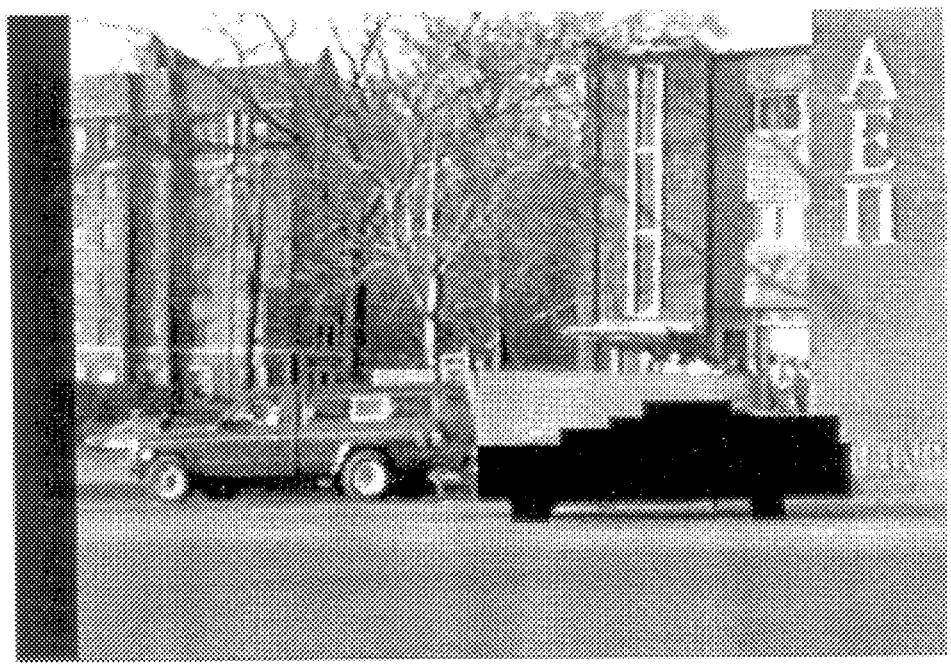

Comparing the images illustrated in FIGS. 17 and 18, it is seen that the automobile in FIG. 18 occludes certain of the background by virtue of its movement to the left. Furthermore, as a result of that movement, certain of the background previously occluded by the automobile is no longer occluded. The material from the background which is known by virtue of the image in FIG. 17, but is now occluded by the new position of the automobile in FIG. 18, is illustrated in FIG. 19. The material in FIG. 19, i.e., the newly occluded background material, is added to the image shown in FIG. 18 to produce the image shown in FIG. 20. That process is repeated as the automobile moves from right to left thereby revealing more and more of the background until, if the car moves entirely out of the image, the entire background is learned.

Figure 23:
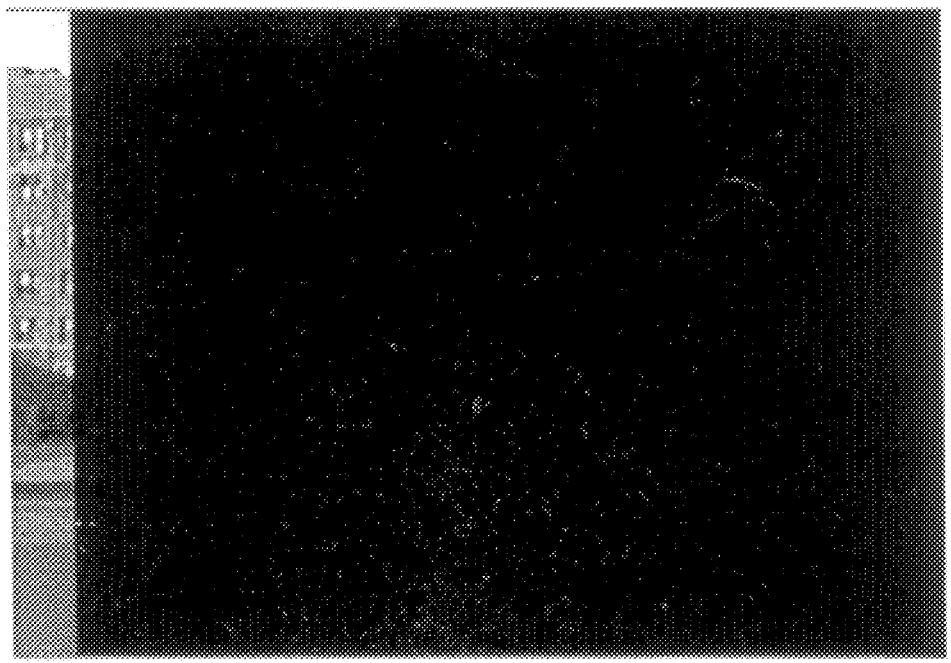
Figure 24:
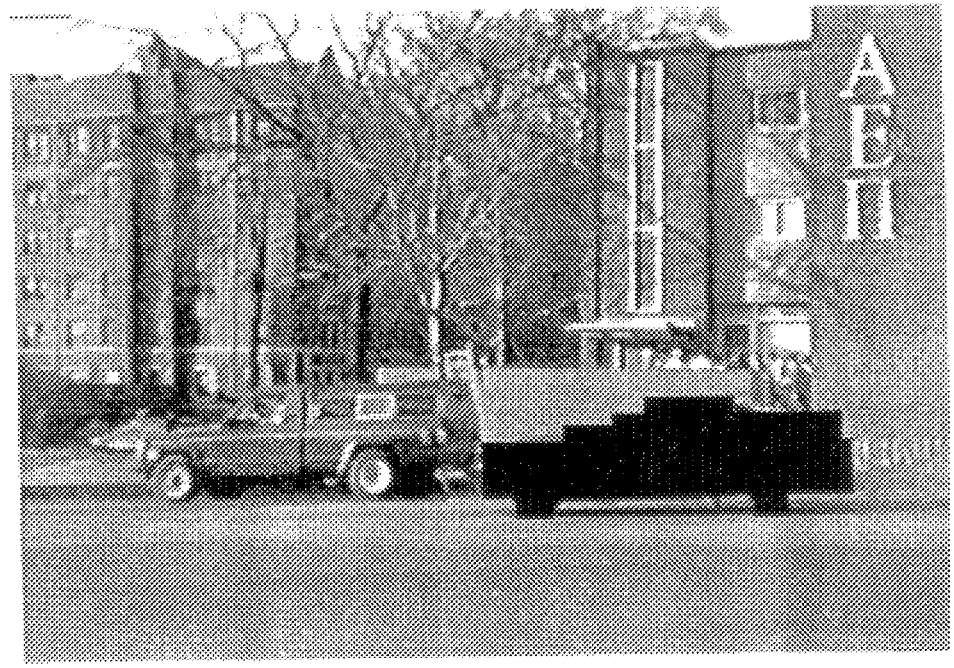

After the system has taken into account changes in the background world image due to figure movement, two instances of the background world image result. The image of FIG. 21 results from the registration of the image of FIG. 17 with the image of FIG. 20. The image of FIG. 22 results from the registration of the image of FIG. 20 with the image of FIG. 18. FIG. 23 illustrates the material that must be added to the image of FIG. 22 which, due to camera motion, was shown in the image of FIG. 21 but is no longer seen in the image of FIG. 22. FIG. 24 illustrates the pasting of the image illustrated in FIG. 22 with the material in FIG. 23. As seen in FIG. 24, the background world image contains the original information illustrated in FIG. 13 along the left hand edge of the image while adding the new material from FIG. 14 along the right hand edge of the image plus the material unoccluded as a result of car motion. FIG. 24 becomes the new background world image which is then used in the next iteration.

An algorithm for carrying out the process shown in FIGS. 13–24 is illustrated in the following table.

TABLE 1

Task: Given a video sequence of images $\{I_1, \ldots, I_N\}$, the figure and the camera velocities, and the figure and the background templates $M_r^F$ and $M_r^B$, respectively, we want to generate the background world image $\Phi^B$.
Algorithm:

1. Initialization: $\Phi_1^B = M_1^B I_1$.
   For r > 1 do:
2. Figure Cut and Paste:
2.1. Get background template $M_r^B$.
2.2 Get figure template $M_r^F$.
2.3 Determine occluded background.
2.4 Paste occluded area to result of 2.1.
3. Background Cut and Paste:
3.1. Register $\Phi_{r-1}^B$.
3.2 Register the result of 2.4.
3.3 Intersect the results of 3.1 and 3.2,
3.4 Cut the result of 3.3 from 3.1.
3.5 Paste the result of 3.4. with 3.2,
   This results in $\Phi^B$.

The registration step 42 of FIG. 7 may require the use of scaling motion. Scaling motion corresponds to the expansion or contraction of the image background and/or of image features. With scaling motion the size or scale of background regions and/or of feature changes, with portions of the background or of features moving in or out of the image. Scaling motion occurs, for example, due to zooming, due to the movement of an observer relative to a static 3-D scene, or due to the motion of objects in depth. There exist two types of scaling motion: (i) contractive motion for which the size of the image background or of image features are reduced in time and new image elements move inwards from the image boundaries; and (ii) expansive motion for which the size of the background or image features are increased in time and image elements move outwards from the image boundaries.

The generation of the world image for scaling motion follows closely that of translational motion. We have scaling cut-and-paste processors, or operators, very similar in concept to the cut-and-paste operators introduced before. The scaling cut-and-paste operators are applied in cascading mode. In scaling motion, each image is at a different scale, being either totally or partially contained inside (contractive motion) or containing (expansive motion) the next image in the sequence. We generate a world image at each of these scales, which leads to a set of world images defined at different scales in an ordered way; this is called a world image pyramid. The scaling cut-and-paste operators remove and/or add rectangular regions inside the images in the sequence and inside the world images. The generation of the world image at a given level depends on the input images and on the world images at coarser levels. We refer to this process as the cascading operation.

Figure 25:
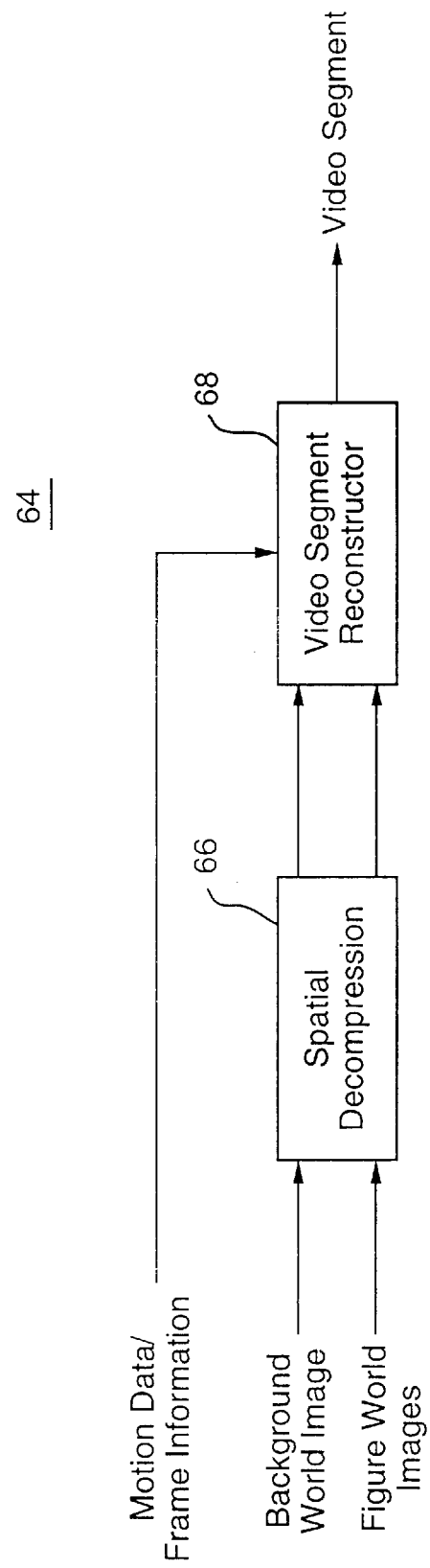
FIG. 25 is a block diagram illustrating a system for reconstructing a frame from world images and motion data.
Figure 26:
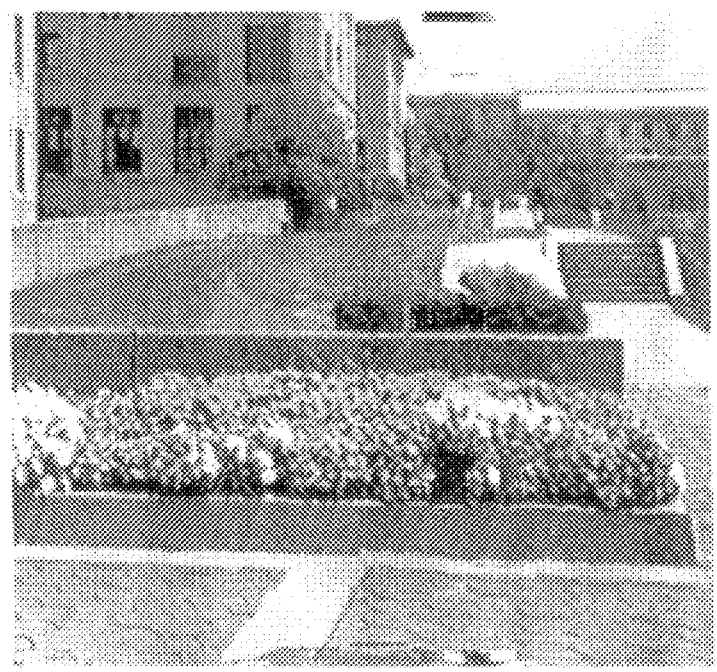
FIGS. 26 through 28 are a series of photographs which illustrate the reconstruction process.
Figure 27:
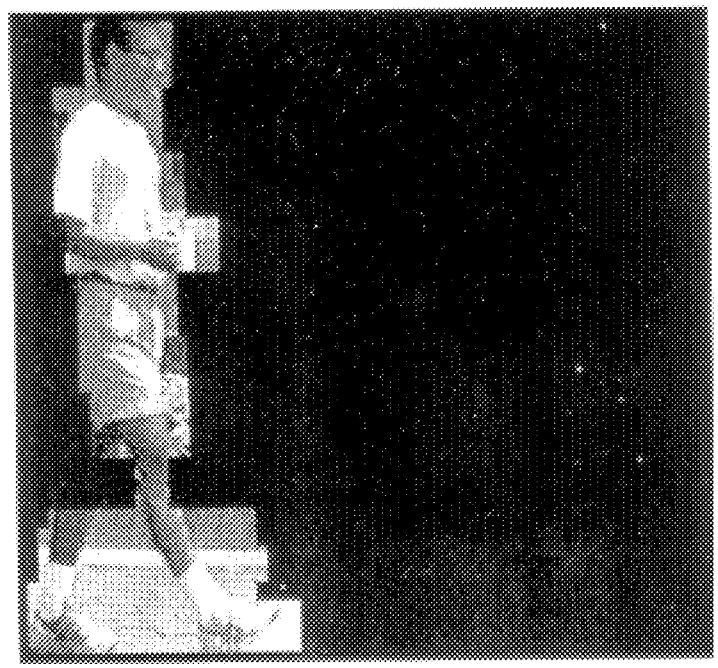
Figure 28:
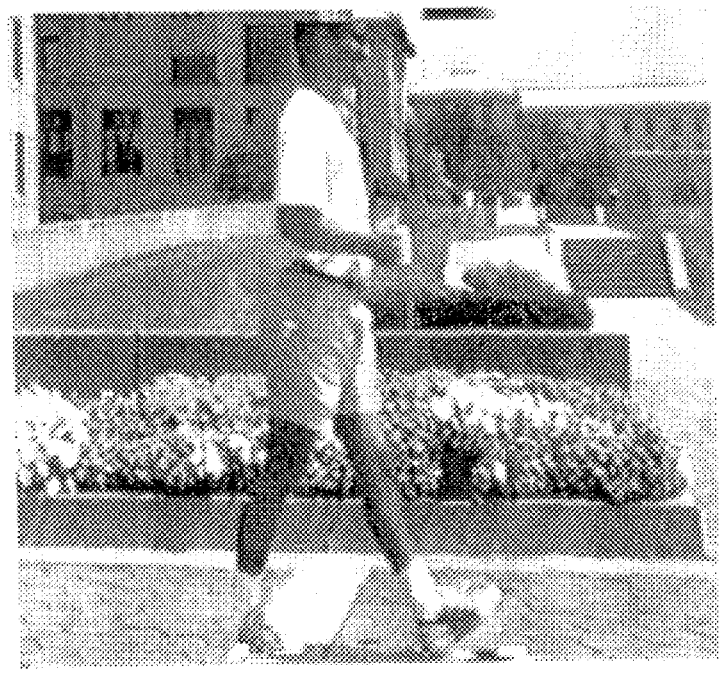

FIG. 25 illustrates a block diagram of a device 64 for reconstructing a video segment from a background world image, figure world images, figure motion data, and frame and stacking information according to the teachings of the present invention. That information could be retrieved from memory or received through any conventional form of transmission. Spatial decompression is performed by a circuit 66 or algorithm which decompresses the world images so that they may be reconstructed. The decompressed world images and the motion data are then input to a video segment reconstructor 68. The video segment reconstructor 68 positions each figure world image on the background world image using the figure motion data for each frame. The video segment reconstructor 68 identifies the boundaries of each frame and outputs the portion of the background world image falling within that boundary. That process is graphically illustrated in FIGS. 26–28. FIG. 26 depicts a final world image while FIG. 27 shows a figure world image, both of which were constructed during an experiment implementing the teachings of the present invention. FIG. 28 shows a frame that video segment reconstructor 68 created from the background world image shown in FIG. 26 and the figure world image shown in FIG. 27.

An algorithm for carrying out the process shown in FIGS. 26–28 is illustrated in the following table.

TABLE 2

Task: Given the figure and background world images, $\Phi^F$ and $\Phi^B$ respectively, the figure and background templates, $M_r^F$ and $M_r^B$ respectively, the world image stratification information, and the figure and camera velocities, and the frame position from the image window opeartor $W_r^I$, reconstruct the video sequence.
Algorithm: For r =1 or r > 1 do:

1. Select figure from figure world image: $M_r^F \Phi_r^F$.
2. Select background from background world image: $M_r^B \Phi_r^B$.
3. Paste the results of 1. and 2.
4. Reconstruct image $I_r$: Ir = $W_1^I (M_r^F \Phi_r^F + M_r^B \Phi_r^B)$.

Preprocessors 28, 28n use a stratification or stacking principle in which world images are stratified in layers according to how objects in the world are distributed at different depth levels. FIGS. 29a and 29b illustrate the stratification principle. FIG. 29a shows the frame of interest. In the frame, an individual is walking in the foreground in front of a building. After stratification, as shown in FIG. 29b, the foreground of the frame is represented by a layer 70, the individual that is walking is represented by a layer 72, and the building and other background is represented by a third layer 74. Stratification can be accomplished by assigning a stacking number identifying which layer belongs on the bottom, i.e., layer 74, which layer belongs on top of that layer, i.e., layer 72, etc. Such stratification is commonly used in computer aided drafting programs where drawings can be built up in layers. The stratified, or stacking information, is stored and output with the motion data.

EXPERIMENTAL RESULTS

An experiment has been performed using a video segment of an outdoor three-dimensional scene. The video segment of thirty (240×256 pixels) images was generated through a static, hand-held camera. It shows a walking person, as shown in FIGS. 3 and 4.

The goal of the experiment was to generate two world images, one for the image background and the other one for the figure (walking person), and the motion data. That requires two sets of operations: pre-processing and cut-and-paste processing.

Pre-processing is divided into three parts. First, we compute the image background velocity. That is realized through a gradient-based method based on pyramids. In this experiment the image background velocity is approximately equal to zero, because the camera is held fixed.

Figure 30:
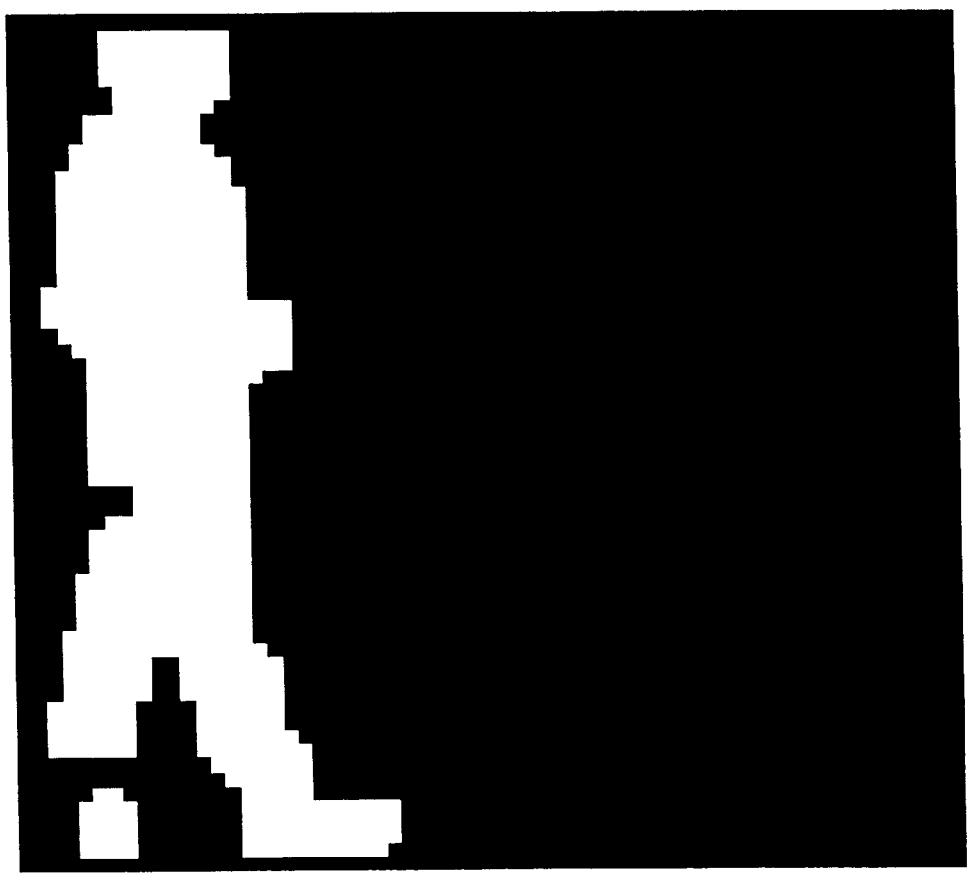
FIG. 30 illustrates a segmented image figure.

Second, we segment the walking person. That requires that we compensate for the image background velocity computed before, i.e., by registering the pixels of each image according to the background velocity. Following that, we apply for each consecutive pair of registered images a motion detection measure operator M(x,y,t)

$$M(x,y,t) = \frac{\left|\frac{\partial I(x,y,t)}{\partial t}\right| \cdot \sqrt{|\nabla I(x,y,t)|}}{|\nabla I(x,y,t)| + C}, \quad (14)$$

where I( . , . , . ) is the image intensity function, C is a constant necessary to avoid numerical instabilities, and ∂I(x,y,t)/∂t and ∇I(x,y,t) correspond to the temporal and spatial image gradients, respectively. ∂I(x,y,t)/∂t and ∇I(x,y,t) are approximated by first order differences in a 2×2×2 cube in the neighborhood of each pixel. Following that operation we binarize the images by applying a threshold T(0≦T≦255) to each of the twenty-nine images obtained through the motion detection measure. That allows for the robust figure segmentation. The parameters used here are C=5.0 and T=6.0. In FIG. 30 we show an image representing the segmented figure.

Third, we tessellate the segmented (binary) figure images into rectangles so that the rectangles approximate the segmented figure. In other words, the complex shape of the segmented figure is now represented by a set of rectangles. The tessellation is obtained by comparing the area of the figure with the area of the approximating rectangles. The best tessellation is obtained by minimizing the cost function:

$$E_T = \left[A^{F_K} - \left(\sum_{\alpha=1}^{N_R} A^F_{\alpha,\kappa}\right)\right]^2 + \lambda N_R, \quad (1)$$

where $A^{RF}_{a,k}$ is the area of the rectangle $R^F_{a,k}$. The first term in (1) is the square of the difference between the area of the figure $F_K$ and that of the sum of rectangles $R^F_{a,k}$. The second term is proportional to the total number of rectangles $N_R$. The constant of proportionality λ determines the relative strength between those two terms, i.e., the trade-off between shape accuracy, determined by the first term, and complexity, determined by the second term.

As a result of minimizing equation (1), we obtain the tessellated figure $F_k$ in terms of a set of rectangles {$R^F_{a,k}$}α=1, ..., $N^R$:

$$F_k = \sum_{\alpha=1}^{N_R} R^{F\alpha,\kappa} \quad (2)$$

Equation (2) describes the rectangular shape tessellation model. As a result of Equation (2), the shape of figures is described by a small set of parameters, which makes the process of world image generation and of video sequence reconstruction manageable from the point of view of its computational complexity.

Figure 31:
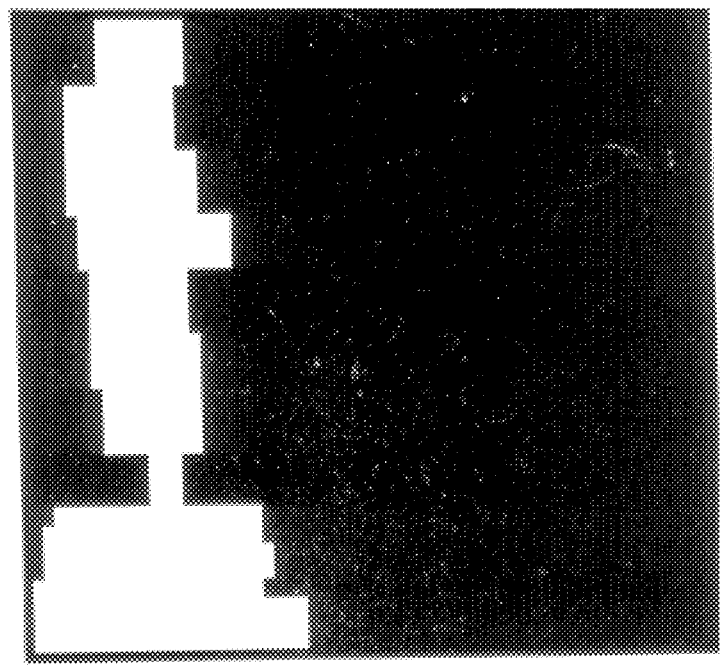
FIG. 31 illustrates a tessellated image figure.
Figure 32:
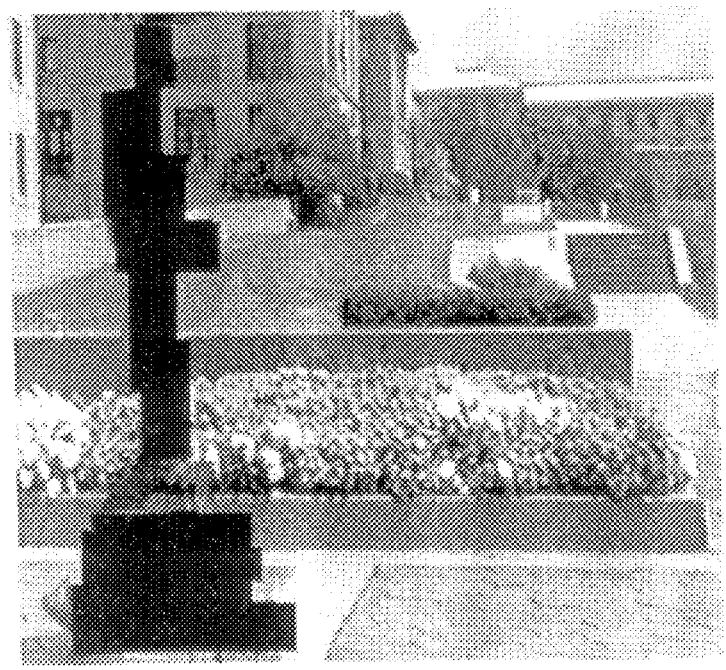
FIGS. 32, 33, 34 and 35 illustrate instances of a background world image as it is being recursively generated.
Figure 33:
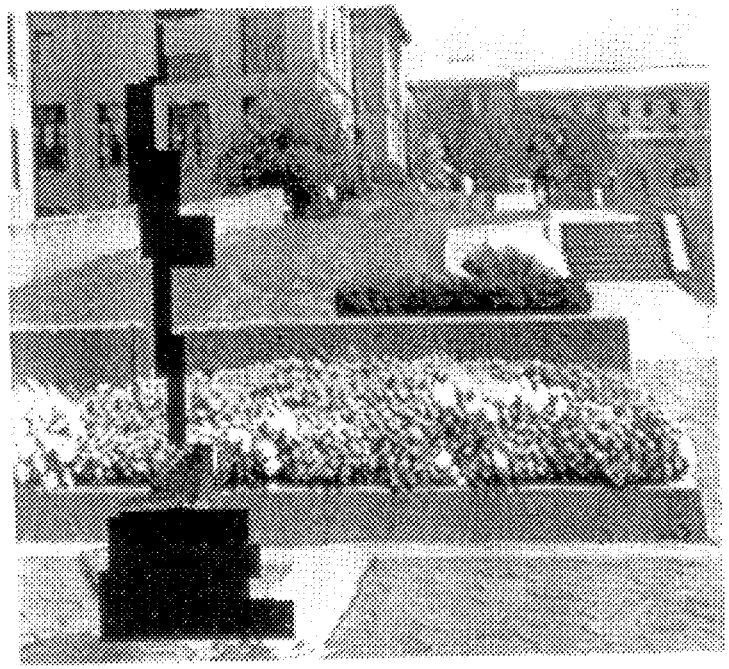
Figure 34:
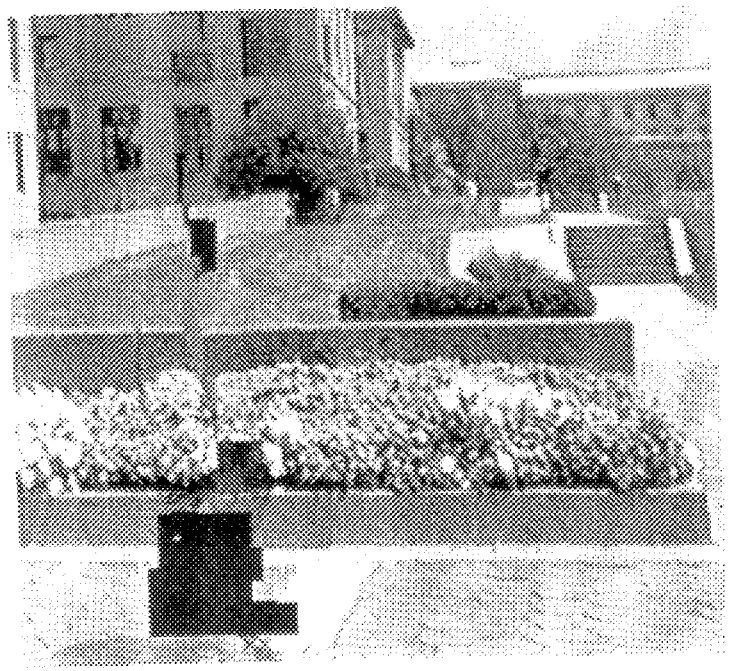
Figure 35:
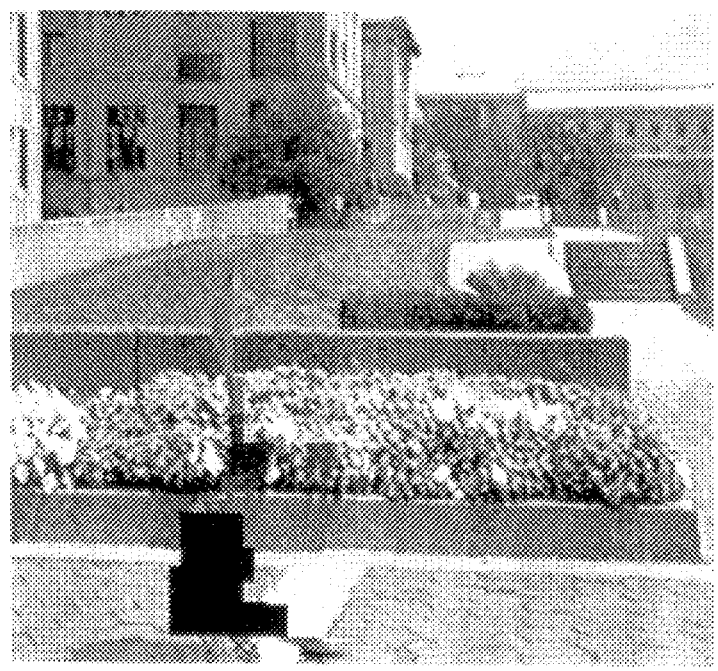

The tessellation was performed separately on the figure torso and feet because the torso moves in horizontal rigid translational motion and the feet move semi-rigidly. The result for the tessellation into sixteen rectangles for the torso and four rectangles for the area representing the feet region is shown in FIG. 31.

World images are generated recursively through cut-and-paste operations, as discussed above. We generate the background and figure world images according to, for $$r=1, \phi^B_1 = M^B_1 I_1 \text{ and } \phi^F_1 = M^F_1 I_1, \quad (3)$$

where $M^B_1$ selects from $I_1$ the background region, and $M^F_1$ selects from $I_1$ the figure region. That is shown in FIGS. 5 and 6, respectively.

Subsequently, for r≧1, we generate the world image $\phi^B$ or $\phi^F$ by using $$\phi_r = A_r \phi_{r-1} + B_r(M,I_r). \quad (4)$$

$A_r$ is decomposed as $$A_r = (I - A_{2,r})A_{1,r}, \quad (5)$$

The role of $A_{1,r}$, $A_{2,r}$ and $B_r$ is the following. By applying $A_{1,r}$ to $\phi_{r-1}$, we register $\phi_{r-1}$ with $I_r$. Likewise, by applying $B_r$ to $I_r$ we register $I_r$ with $\phi_{r-1}$. That uses the information about camera motion, i.e., the rate at which the camera scanned the world from instant r−1 to instant r. Next, by applying $A_{2,r}$ to $A_{1,r}\phi_{r-1}$ we determine that area of the world image $\phi_{r-1}$ which is common to $I_r$. That common region is deleted from $A_{1,r}\phi_{r-1}$. That gives us (I−$A_{2,r}$)($A_{1,r}\phi_{r-1}$) or, for short, $A_r\phi_{r-1}$. The results of that process for r=5, 8, 11, and 28 are shown in FIGS. 32, 33, 34, and 35, respectively. The final background world image corresponds to r=28.

In this particular experiment, the figure world image $\phi^F$ is identical to its first instance shown in FIG. 5, i.e., $\phi^F = \phi^F_1$. It is important to remark that (3) and (4) incorporate the solution to the occlusion problem.

The importance of using tessellated figure shapes is shown in FIGS. 32–35. Without that simple shape model, the process of "filling in" the image background region being unoccluded by the walking person would be very unstable, it would generate many artifacts, and would be computationally complex. In our framework, the recursive process of world image generation using tessellated figure shape templates is robust and it describes in simple mathematical terms the problem of image occlusion.

CONCLUSION

The present invention is directed to a framework for content-based video sequence representation. It provides a method of compressing a video segment at a very high compression ratio. Additionally, the present invention provides a method of reconstructing video from compressed video. Those of ordinary skill in the art will recognize that many modifications and variations of the present invention may be implemented without departing from the spirit and scope of the present invention. Accordingly, all such modifications and variations are intended to be covered by the specification and the following claims.

What is claimed is:

1. A method of compressing a video segment comprised of a series of frames, comprising the steps of:

preprocessing a frame to obtain figure motion data for each moving figure, said preprocessing comprising the steps of:
  comparing said frame to another frame;
  estimating image velocity at certain locations;
  estimating background velocity of said frame;
  adjusting said image velocity to compensate for said background velocity;
  segmenting each said moving figure; and
  estimating figure velocity of each segmented moving figure of said frame;

tessellating any moving figures to produce an instance of a template for each moving figure and an instance of a background template;

storing said figure motion data in a manner so as to associate said figure motion data with said frame;

storing frame information representative of the size and position of said frame with respect to a background world image;

comparing each of said instances of a template to a world image for that template to cut material common to both from one and to add the remaining material to form a new world image;

repeating each step until all the frames in the series are processed; and outputting each world image, said figure motion data, and said frame information.

2. The method of claim 1 additionally comprising the step of compressing each world image before said outputting step.

3. The method of claim 1 wherein said step of storing said figure motion data includes the step of storing data identifying the coordinates of a reference point for the figure, the size of the figure, and the position of the figure.

4. The method of claim 1 wherein said step of tessellating any moving figures includes the step of tessellating any moving figures using a rectangular approximation technique.

5. The method of claim 1 additionally comprising the step of using said motion data to register each said instance of a template with said world image for that template prior to cutting material common to both from one.

6. The method of claim 5 wherein said step of cutting material common to both from one includes the step of cutting the material common to both from said world image.

7. The method of claim 5 wherein said step of cutting material common to both from one includes the step of cutting the material common to both from said instance of a template.

8. The method of claim 5 further comprising the step of equalizing an illumination level of said world image with an illumination level of said template prior to cutting material common to both from one.

9. The method of claim 1 additionally comprising the step of preprocessing each frame to produce stacking information which indicates whether any moving figures occlude other moving figures, and wherein said stacking information is stored and output with said motion data.

10. The method of claim 1 wherein said outputting step includes the step of outputting each world image, said figure motion data, and said frame information for storage.

11. The method of claim 2 additionally comprising the steps of decompressing each world image and of reconstructing said frame from said decompressed world images, said motion data, and said frame information.

12. The method of claim 1 wherein said world images are generated based on content based methods.

13. An apparatus for compressing a video segment comprised of a series of frames, comprising:

means for preprocessing a frame to obtain figure motion data for each moving figure, said means for preprocessing comprising:

means for comparing said frame to another frame;

means for estimating image velocity at certain locations;

means for estimating background velocity of said frame;

means for adjusting said image velocity to compensate for said background velocity;

means for segmenting each said moving figure; and means for estimating figure velocity of each segmented moving figure of said frame;

means for tessellating any moving figures to produce an instance of a template for each moving figure and an instance of a background template;

first means for storing said figure motion data in a manner so as to associate said figure motion data with said frame;

second means for storing frame information representative of the size and position of said frame with respect to a background world image; and means for comparing each of said instances of a template to a world image for that template, for cutting material common to both from one, and for adding the remaining material to form a new world image.

* * * * *

UNITED STATES PATENT AND TRADEMARK OFFICE
CERTIFICATE OF CORRECTION

PATENT NO. : 5,854,856
DATED : December 29, 1998
INVENTOR(S) : Moura et al.

It is certified that error appears in the above-identified patent and that said Letters Patent is hereby corrected as shown below:

COLUMN 5:

Line 7, delete "anticipate" and insert therefor --anticipated--.

COLUMN 7:

Line 43, delete "$_{r-1}{}^{B}$" and insert therefor --$\Phi_{r-1}{}^{B}$--.

COLUMN 10:

Line 44, delete "$A_{1,4}\ \Phi_{r-1}$" and insert therefore --$A_{1,r}\ \Phi_{r-1}$--.

Signed and Sealed this

Twenty-second Day of May, 2001

NICHOLAS P. GODICI

Attest:

Attesting Officer          Acting Director of the United States Patent and Trademark Office